United States Patent [19]

Limbacher et al.

[11] Patent Number: 4,633,993
[45] Date of Patent: Jan. 6, 1987

[54] HYDRAULICALLY OPERATED CLUTCH RELEASE BEARING

[75] Inventors: Bernhard Limbacher, Niederwerrn; Karl Müller, Kronungen; Gottfried Mader, Ebelsbach, all of Fed. Rep. of Germany

[73] Assignee: Fichtel & Sachs AG, Schweinfurt, Fed. Rep. of Germany

[21] Appl. No.: 631,612

[22] Filed: Jul. 17, 1984

[30] Foreign Application Priority Data

Jul. 20, 1983 [DE] Fed. Rep. of Germany ....... 3326107

[51] Int. Cl.⁴ .................. F16D 23/14; F16D 25/08
[52] U.S. Cl. ................... 192/98; 192/110 B; 192/85 CA
[58] Field of Search ............ 192/85 C, 85 CA, 98, 192/101, 110 B, 110 R, 109 A, 109 R, 91 R, 91 A, 106.2

[56] References Cited

U.S. PATENT DOCUMENTS

| | | | |
|---|---|---|---|
| 3,416,637 | 12/1968 | Maurice | 192/98 |
| 3,900,091 | 8/1975 | Maucher | 192/98 |
| 3,921,775 | 11/1975 | Matyschik | 192/98 |
| 4,143,748 | 3/1979 | Maucher | 192/98 |
| 4,270,645 | 6/1981 | Becaris | 192/106.2 |
| 4,524,855 | 6/1985 | Brandenstein | 192/91 A X |
| 4,526,258 | 7/1985 | Huber | 192/91 A |

FOREIGN PATENT DOCUMENTS 2815971 10/1979 Fed. Rep. of Germany .
3043861 8/1982 Fed. Rep. of Germany .

Primary Examiner—George H. Krizmanich
Attorney, Agent, or Firm—Toren, McGeady, Stanger, Goldberg & Kiel

[57] ABSTRACT

The hydraulically operable clutch release for a motor vehicle friction clutch comprises a housing part (3) of substantially ring form and an annular piston (9) guided displaceably in sealed manner in the direction of the ring axis on the housing part (3). The annular piston (9) together with the housing part (3) forms an annular hydraulic pressure chamber (15) and comprises a stop face (29) facing axially away from the pressure chamber (15). A release bearing (19) guided both axially and radially movably on the annular piston (9) has a non-rotating race ring (23) supportable radially movably on the stop face (29) of the annular piston and a rotating race ring (21) constantly abutting in radially movable manner on a release device (37) of the friction clutch. Between the housing part (3) and the annular piston (9) there is compressed an axially acting compression spring (31) for the permanent supporting of the rotating race ring (21) on the release device (37). Between the non-rotating race ring (23) and the annular piston (9) there is supported a spring (33) which holds the stop face (29) of the annular piston (9) at a distance from the non-rotating race ring (23) against the action of the compression spring (31) when the pressure chamber (15) is relieved of pressure for the engagement of the friction clutch. The spring (33) is so dimensioned that when the pressure chamber (15) is charged with pressure for the release of the friction clutch it permits supporting of the stop face (29) on the non-rotating race ring (23).

6 Claims, 4 Drawing Figures

4,633,993

HYDRAULICALLY OPERATED CLUTCH RELEASE BEARING

BACKGROUND OF THE INVENTION

The invention relates to a hydraulically operable clutch release bearing for a motor vehicle friction clutch.

STATEMENT OF PRIOR ART

From Fed. German Publ. Spec. No. 30 43 861 a hydraulically operable clutch release device is known in the substantially ring-shaped housing of which an annular piston sealed by means of a diaphragm in the direction of the ring axis is displaceably guided. The annular piston together with the housing defines an annular hydraulic working chamber. On the side facing the release devices of the friction clutch, for example the spring tongues of the diaphragm spring of this clutch, a release bearing is both axially and radially movably guided on the annular piston. A compression spring stressed in between the housing and the annular piston constantly stresses the release bearing between an axial stop face of the annular piston and the release elements of the friction clutch, that is to say even when the clutch is engaged. By reason of its radial mobility the release bearing is self-centering. Since the rotating race ring of the release bearing constantly abuts on the spring tongues of the diaphragm spring, on the one hand the stroke of the annular piston is utilised completely for the release movement of the clutch and also acceleration noises and acceleration wear between the race ring and the spring tongues are reduced. The sealing of the working chamber by means of a diaphragm or a sealing bellows element is comparatively expensive in construction.

From Fed. German Publ. Spec. No. 28 15 971 another hydraulically operable clutch release is known in which a piston sleeve carrying the release bearing is axially displaceably guided on a cylinder bush fast with the transmission. Spring clips hold the rotating race ring of the release bearing fast on the spring tongues of the diaphragm spring. Due to residual unbalance, spring tongue play and axial play of the crank shaft of the internal combustion engine, vibrations can be transmitted through the release bearing to the piston. Especially at higher rotation rates this can have the consequence that air enters the hydraulic system, which is detrimental to the release operation of the clutch.

OBJECT OF THE INVENTION

An object of the invention is to improve a hydraulically operable clutch release of a motor vehicle friction clutch, the self-centering release bearing of which comprises a race ring constantly rotating with the clutch, in such a way that vibrations and the consequent sealing problems of the hydraulic working chamber are reliably avoided, despite low construction expense.

SUMMARY OF THE INVENTION

According to the invention the rotating race ring of the release bearing is pressed by a compression spring stressed between the housing part and the annular piston against the release elements of the friction clutch, for example the spring tongues of the diaphragm spring, when the clutch is in both the engaged condition and the disengaged condition. The annular piston has a stop face which abuts on the non-rotating race ring of the release bearing when the clutch is disengaged. When the clutch is engaged a spring device supported between the non-rotating race ring and the annular piston holds this stop face at a distance from the non-rotating race ring, against the action of the compression spring. In this way the object is achieved that the axial forces acting upon the release bearing from the clutch are kept away from the annular piston, so that the latter is completely isolated from the vibrations of the internal combustion engine. The piston can thus be guided radially by sealing rings on the cylinder walls for the axial displacement movement, without need to fear the entry of air into the hydraulic system by reason of vibrations.

In a preferred embodiment the spring device comprises two spring elements which, acting axially against one another, hold the non-rotating race ring between them and isolate it as regards vibrations from the annular piston.

The spring elements can be rubber-elastic parts. However, corrugated annular springs are preferably provided which are seated in annular grooves axially open to the release bearing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
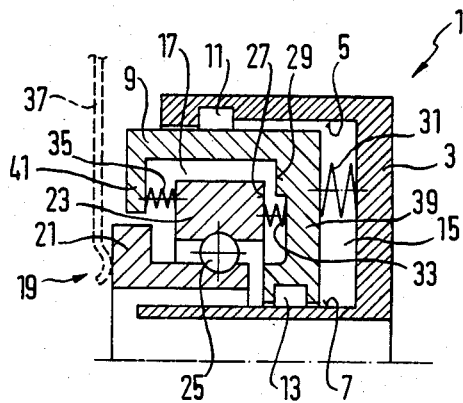
FIG. 1 shows a diagrammatic longitudinal section through a hydraulically operable clutch release of a pressed-type motor vehicle friction clutch.

FIG. 1 shows a diagrammatic longitudinal section through the upper half of a hydraulically operable clutch release 1. This comprises a housing part 3 which is held in a manner not further illustrated on a transmission of the motor vehicle. The housing part 3 has the form of a hollow annular cylinder in the mutually concentrically extending cylinder surfaces 5, 7 of which an annular piston 9 is guided radially for its axial displacement by means of annular seals 11, 13. The annular piston 9 with the housing part 3 forms a hydraulic pressure chamber 15 which can be charged from a clutch pedal through a hydraulic pressure system in a manner which is not further illustrated but is conventional. The annular piston 9 has on its side axially remote from the pressure chamber 15 a cavity 17 open towards the friction clutch in which a release bearing 19 is arranged with both radial and axial play in relation to the annular piston 9. The release bearing 19, which is formed as a ball-bearing in the embodiment as illustrated, comprises a rotating race ring 21, a non-rotating race ring 23 and rolling bodies 25. The race ring 23 has on its side axially facing the pressure chamber 15 an abutment face 27 opposite to which there lies a counter-abutment face 29 of the annular piston 9. Between the annular piston 9 and the housing part 3 there is compressed an axially acting compression spring 31. The non-rotating race ring 23 of the release bearing 19 is held axially resiliently between two axially acting compression springs 33 and 35 in the cavity 17 of the annular piston 9. The springs 33, 35 permit radial play of the release bearing 19 so that the latter can automatically center itself in relation to the release elements 37 of the clutch, for example the spring tongues of the diaphragm spring of the clutch. The spring 33 is compressed between the non-rotating race ring 23 and a crown 39 of the annular piston 9. The annular piston 9 grasps in the axial direction over the non-rotating race ring 23 and carries, at its end axially remote from the crown 39, an annular flange 41 grasping radially before the end face of the non-rotating race ring 23. The spring 35 is compressed in between the annular flange 41 and the non-rotating race ring 23. The annular flange 41 furthermore holds the release bearing 19 on the clutch release 1 so that it cannot be lost, during assembly and until installation in the motor vehicle. The rotating race ring 21 extends in the axial direction out of the annular piston 9 and rests upon the release devices 37 of the clutch.

The compression spring 31 compressed in between the housing part 3 and the annular piston 9 ensures in all operational conditions that the rotating race ring 21 constantly abuts on the release devices 37 of the clutch and rotates with them. Thus the self-centering of the release bearing 19 is continuously maintained and the annular piston 9 on actuation of the clutch has to carry out no unnecessary idle travel. The two springs 33, 35, axially bracing in the release bearing 19, and the compression spring 31 are adapted to one another in such a way that the abutment face 27 and the counter-abutment face 29 have a predetermined spacing from one another when the clutch is in the engaged condition. In the engaged condition an equilibrium prevails between the resultant spring force of the two springs 33, 35 and the force of the compression spring 31. The equilibirium is so selected that an axial distance is also maintained between the annular flange 41 and the non-rotating race ring 23 and the clutch release bearing 19 can move in relation to the annular piston 9 so that vibrations transmitted from the internal combustion engine to the release bearing 19 are not passed on to the annular piston 9. For the release of the clutch the pressure of the hydraulic fluid in the pressure chamber 15 is increased so that the annular piston 9 is displaced in the direction towards the clutch against the force of the spring 33 supported through the release bearing 19 on the clutch. The abutment face 27 then abuts on the counter-abutment face 29 and the release force is transmitted directly from the annular piston 9 to the release bearing 19.

The compression spring 31 preferably has a smaller spring constant or rate than the harder spring 33. On the other hand the compression spring 31 has a high initial compression, while the initial compression of the spring 33 is slight. In this way it is ensured that the gap between the abutment face 27 and the counter-abutment face 29 can fluctuate only slightly and the variation of the distance between annular piston 9 and housing part 3 caused by wear of the clutch effects no substantial variation of the force of the compression spring 31 during the life of the clutch.

By reason of the free suspension of the release bearing 19 on the annular piston 9 in the engaged condition of the clutch it is ensured that the vibrations acting upon the release bearing 19 from the internal combustion engine are not transmitted directly to the annular piston 9, so that the pressure chamber 15 and the entire hydraulic system of the clutch actuation remain free from vibration influences.

Figure 2:
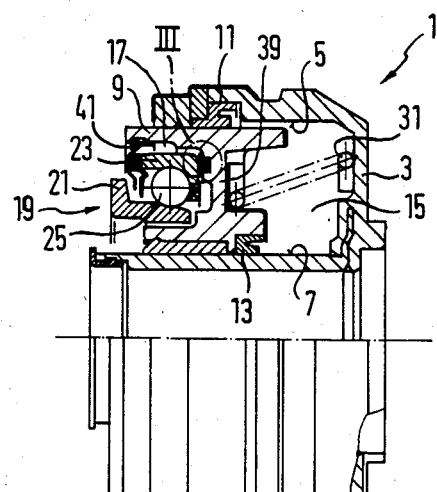
FIG. 2 shows a detailed longitudinal section through the clutch release according to FIG. 1.
Figure 3:
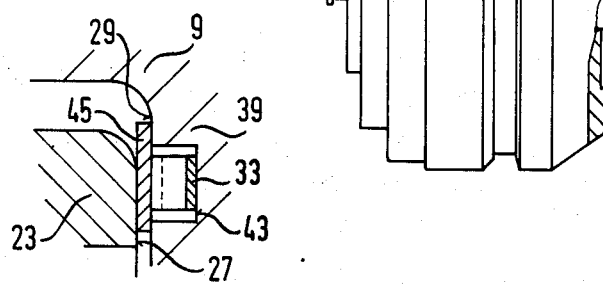
FIG. 3 shows a detail of the clutch release marked with III in FIG. 2.

FIGS. 2 and 3 show details of the construction of the clutch release as represented in principle in FIG. 1. Parts of like effect are designated by like reference numerals, so that for more detailed explanation of FIG. 2 reference is made to the description of FIG. 1. FIG. 3 shows details of the spring 33 in the engaged condition of the clutch. The spring 33 is formed as a corrugated annular spring and is seated in an annular groove 43, open towards the non-rotating race ring 23, in the crown 39 of the annular piston 9. Axially between the annular spring 33 and the non-rotating race ring 23 there is arranged an annular washer 45 which covers the opening side of the annular groove 43. The washer 45 forms an abutment face for the spring 33 and guarantees that the race ring 23, as a result of the self-centering of the release bearing 19, can depart either radially outwards or radially inwards slightly from the region of the annular groove 43. It may furthermore be seen from FIG. 3 that the abutment face 27 abuts on the counter-abutment face 29 through the washer 45.

Details of the spring 35 are not illustrated. However, the spring 35 is also preferably formed as a corrugated annular spring which is seated in an annular groove of the annular flange 41 axially open towards the race ring 23. The annular groove can again be covered by an annular washer.

Figure 4:
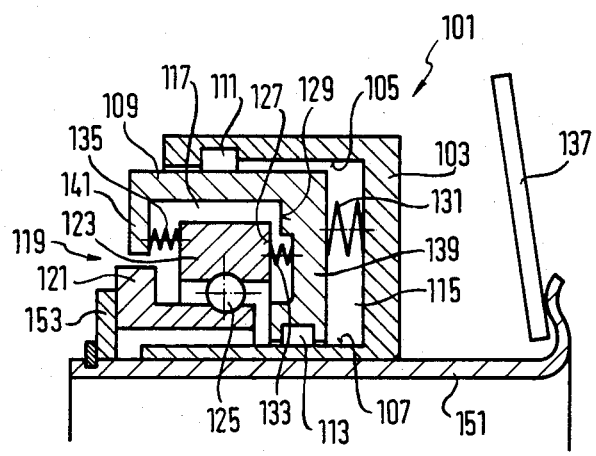
FIG. 4 shows a diagrammatic longitudinal section through a hydraulically operable release of a pulled-type motor vehicle friction clutch.

FIG. 4 shows a diagrammatic longitudinal section through the upper half of a clutch release 101 for use with a pulled-type motor vehicle friction clutch. Parts having like effect as regards function are designated in FIG. 4 with reference numerals increased by the number 100 in comparison with the parts in FIG. 1. For more detailed explanation of the construction and manner of operation therefore reference is made to the description of FIGS. 1 to 3.

In departure from the clutch release 1 of the pressed-type clutch the release elements 137 are arranged on the side of the hydraulic pressure chamber 115 axially remote from the clutch release bearing 119. A sleeve 151 axially displaceably guided in the annular opening of the housing part 103 grasps behind the spring tongues 137 of the diaphragm spring of the clutch and is in permanent self-centering abutment contact through a removable stop 153 with the rotating race ring 121 of the release bearing 119. In the release of the clutch the spring tongues 137 are drawn towards the housing part 103.

While specific embodiments of the invention have been shown and described in detail to illustrate the application of the inventive principles, it will be understood that the invention may be embodied otherwise without departing from such principles.

We claim:

1. In a hydraulically operable clutch release device for a motor vehicle friction clutch, comprising
    (a) a substantially annular housing part defining a ring axis;
    (b) an annular piston displaceably guided in sealed manner in the direction of the ring axis on the housing part, which piston together with the housing part defines an annular hydraulic pressure chamber and possesses a stop face facing axially away from the pressure chamber, (c) a release bearing guided both axially and radially movably on the annular piston, with a non-rotating race ring supportable radially movably on the stop face of the annular piston and with a rotating race ring intended for radially movable supporting on release members of the friction clutch, (d) an axially acting compression spring compressed in between the housing part and the annular piston for the permanent self-centering supporting of the rotating race ring on the release members, (e) said release bearing including spring means supported between the non-rotating race ring and the annular piston, said spring means holding the stop face of the annular piston at a distance from the non-rotating race ring, against the action of the compression spring, when the pressure chamber is relieved of pressure for the engagement of the friction clutch, and permitting the supporting of the stop face on the non-rotating race ring when the pressure chamber is charged with pressure for the disengagement of the friction clutch, and the spring means comprises two spring elements which, acting axially contrarily of one another, clamp the non-rotating bearing race ring in between them.

2. Clutch release according to claim 1, wherein the annular piston carries on the side of the non-rotating race ring axially remote from the stop face an annular flange extending radially beyond the non-rotating race ring and holding the non-rotating race ring on the annular piston so that it cannot be lost, and wherein one of the spring elements is supported on the annular flange.

3. Clutch release according to claim 1, wherein at least one said spring element formed as corrugated annular spring resilient in its axial direction, said annular spring being seated in an annular groove of the annular piston open towards the non-rotating race ring.

4. Clutch release according to claim 3, wherein an annular washer radially covering the annular groove is arranged axially between the non-rotating race ring and the corrugated annular spring.

5. Clutch release according to claim 4, wherein the washer radially overlaps the stop face of the annular piston.

6. Clutch release according to claim 1, wherein the housing part is formed as an annular cylinder on the cylinder surfaces of which the annular piston is radially guided in sealed manner for its axial displacement.

* * * * *